(12) United States Patent
Jang et al.

(10) Patent No.: US 12,380,452 B2
(45) Date of Patent: Aug. 5, 2025

(54) TRANSACTION VERIFICATION SYSTEM FOR BLOCKCHAIN, AND TRANSACTION VERIFICATION METHOD FOR BLOCKCHAIN

(71) Applicant: GWANGJU INSTITUTE OF SCIENCE AND TECHNOLOGY, Gwangju (KR)

(72) Inventors: Jehyuk Jang, Gwangju (KR); Heung-No Lee, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 478 days.

(21) Appl. No.: 17/611,506

(22) PCT Filed: Dec. 12, 2019

(86) PCT No.: PCT/KR2019/017571
§ 371 (c)(1),
(2) Date: Nov. 15, 2021

(87) PCT Pub. No.: WO2020/241995
PCT Pub. Date: Dec. 3, 2020

(65) Prior Publication Data
US 2022/0215394 A1 Jul. 7, 2022

(30) Foreign Application Priority Data

May 24, 2019 (KR) .................. 10-2019-0061493
Sep. 30, 2019 (KR) .................. 10-2019-0120655

(51) Int. Cl.
*G06Q 20/40* (2012.01)
*G06Q 20/06* (2012.01)
*G06Q 20/22* (2012.01)

(52) U.S. Cl.
CPC ....... *G06Q 20/4016* (2013.01); *G06Q 20/065* (2013.01); *G06Q 20/223* (2013.01); *G06Q 20/405* (2013.01)

(58) Field of Classification Search
None
See application file for complete search history.

(56) References Cited

U.S. PATENT DOCUMENTS 10,785,033 B2 * 9/2020 Karame ............. G06F 21/6245
10,868,825 B1 * 12/2020 Dominessy ........... H04L 43/045
(Continued)

FOREIGN PATENT DOCUMENTS

KR 101796690 B1 11/2017
KR 20180014534 A 2/2018
(Continued)

OTHER PUBLICATIONS

PCT/KR2019/017571. International Search Report (Mar. 31, 2020).
Jang et al. "Profitable Double-Spending Attacks." Appl. Sci. 2020 10(23), 8477 (Nov. 27, 2020).

Primary Examiner — Nilesh B Khatri
Assistant Examiner — Jahed Ali
(74) Attorney, Agent, or Firm — Heidi Eisenhut; LOZA & LOZA, LLP (57) ABSTRACT

A blockchain transaction confirmation system according to the present disclosure includes: a user information input interface to which user information is inputted; an external information input interface to which external information related to a cryptocurrency system is inputted; an appropriate confirmation number searcher configured to search for a block confirmation number appropriate for confirmation of a transaction in progress of creation by using the external information and the user information; and an appropriate confirmation number output interface configured to output the block confirmation number. According to the present
(Continued)

disclosure, a user can automatically find out the block confirmation number required for safe and quick transaction.

6 Claims, 5 Drawing Sheets

(56) References Cited

U.S. PATENT DOCUMENTS

| | | | | |
|---|---|---|---|---|
| 11,108,786 | B2 * | 8/2021 | Wang | G06Q 20/405 |
| 11,763,275 | B2 * | 9/2023 | Kim | G06Q 20/20 |
| | | | | 705/39 |
| 2009/0217056 | A1 * | 8/2009 | Malpani | G06F 21/41 |
| | | | | 713/193 |
| 2015/0052350 | A1 * | 2/2015 | Aumasson | H04L 63/12 |
| | | | | 713/155 |
| 2015/0363778 | A1 * | 12/2015 | Ronca | G06Q 20/4016 |
| | | | | 705/71 |
| 2016/0283920 | A1 * | 9/2016 | Fisher | H04L 9/3239 |
| 2017/0085582 | A1 * | 3/2017 | Kwiat | H04L 63/1441 |
| 2018/0005235 | A1 * | 1/2018 | Thorne | G06Q 20/3829 |
| 2018/0191502 | A1 * | 7/2018 | Karame | H04L 63/12 |
| 2018/0323964 | A1 * | 11/2018 | Watanabe | H04L 9/0637 |
| 2018/0374094 | A1 * | 12/2018 | Kohli | G06Q 20/065 |
| 2019/0012695 | A1 * | 1/2019 | Bishnoi | G06Q 20/223 |
| 2019/0130391 | A1 * | 5/2019 | Wright | G06Q 20/065 |
| 2019/0188685 | A1 * | 6/2019 | Gaitanos | G06Q 20/4012 |
| 2019/0273725 | A1 * | 9/2019 | Allen | H04L 9/0637 |
| 2019/0279160 | A1 * | 9/2019 | Whitney | H04L 9/0643 |
| 2019/0394050 | A1 * | 12/2019 | Goeringer | H04L 9/3263 |
| 2020/0012796 | A1 * | 1/2020 | Trepagnier | G06F 18/254 |
| 2020/0250174 | A1 * | 8/2020 | Padmanabhan | G06F 16/2365 |
| 2020/0252406 | A1 * | 8/2020 | Padmanabhan | H04L 9/3271 |
| 2020/0285637 | A1 * | 9/2020 | Bandyopadhyay | H04L 9/50 |
| 2021/0218710 | A1 * | 7/2021 | Fallah | H04L 9/14 |
| 2021/0375409 | A1 * | 12/2021 | Romantsov | H04L 67/1097 |

FOREIGN PATENT DOCUMENTS

| | | | | |
|---|---|---|---|---|
| KR | | 101951408 B1 | 2/2019 | |
| WO | WO-2020213763 A1 * | | 10/2020 | G06F 11/3006 |

* cited by examiner

TRANSACTION VERIFICATION SYSTEM FOR BLOCKCHAIN, AND TRANSACTION VERIFICATION METHOD FOR BLOCKCHAIN

TECHNICAL FIELD

The present invention relates to a blockchain transaction confirmation system and a blockchain transaction confirmation method.

BACKGROUND ART

Recently, cryptocurrency has reached the stage of performing the function of real-world currency in commercial transaction. The transaction through the cryptocurrency is finalized through block confirmation. The block confirmation is a technology that finalizes transactions after confirming that blocks corresponding to the pre-set block confirmation number are generated after the transaction in progress between traders has occurred. For example, when the block confirmation number is 6, the transaction is finalized after waiting for the generation of six additional blocks after the block in which the transaction between traders is recorded. The transaction finalization may exemplify that a person having a product sends the product to a cryptocurrency provider.

Non-Patent Literature 1 proves that as the block confirmation number increases, the transaction is safer.

The block confirmation may be utilized as a means for defending against double spending. The double spending refers to an attack action in which a malicious user cancels a true transaction by secretly providing a malicious blockchain longer than a blockchain of the true transaction by using the principle of the blockchain in which the longest blockchain survives.

As the block confirmation number increases, the probability of being double-spent decreases. However, as the block confirmation number increases, it takes a longer time to finalize the transaction. For example, in the case of Bitcoin, an average block generation cycle is 10 minutes. Therefore, when the block confirmation number is 6, the transaction finalization time is 60 minutes. This means that a user needs to wait 60 minutes to buy a bottle of Coke. These problems are becoming a big obstacle to the practical use of cryptocurrencies in real-world.

Under this background, in current transactions using cryptocurrency, it is common for traders to determine the block confirmation number at their own risk by referring to guidelines given for each transaction amount. However, traders are not sure how many block confirmations they need for their transactions, since the double attack success probability never becomes zero no matter how many confirmations have been performed.

Citation List: (Non-Patent Literature 1) S Nakamoto, "Bitcoin: A Peer-to-Peer Electronic Cash System" [Online] Available: https://bitcoinorg/bitcoinpdf

DISCLOSURE OF INVENTION

Technical Problem

The present disclosure proposes a blockchain transaction confirmation system and a blockchain transaction confirmation method, which propose an appropriate block confirmation number for given real-time conditions.

The present disclosure proposes a blockchain transaction confirmation system and a blockchain transaction confirmation method, which are capable of safely and quickly completing a transaction through cryptocurrency in response to various external environments as well as a transaction amount inputted by a trader.

The present disclosure proposes a blockchain transaction confirmation system and a blockchain transaction confirmation method, which are capable of achieving both the secure transaction and the quick transaction finalization through cryptocurrency.

TECHNICAL SOLUTION

A blockchain transaction confirmation system according to the present disclosure includes: a user information input interface to which user information is inputted; an external information input interface to which external information related to a cryptocurrency system is inputted; an appropriate confirmation number searcher configured to search for a block confirmation number appropriate for confirmation of a transaction in progress of creation by using the external information and the user information; and an appropriate confirmation number output interface configured to output the block confirmation number. According to the present disclosure, a user can automatically find out the block confirmation number required for safe and quick transaction.

The user information may include at least an input transaction amount inputted by a user. Therefore, safe transaction can be quickly performed in response to the input transaction amount inputted by the user.

The external information may include at least one of a reward paid for generating a block at the time, an average cost required for generating a block at the time, or an average rate per time of block generation at the time. It is possible to find out a more accurate block confirmation number by understanding the attack tendency of an attacker using a cryptocurrency system. Furthermore, it is possible to find out the optimal safe transaction limit amount for a given type of cryptocurrency system.

The external information may include all of a reward paid for generating a block at the time, an average cost required for generating a block at the time, and an average rate per time of block generation at the time. Therefore, a more accurate block confirmation number may be found.

The appropriate confirmation number searcher may include: a safe transaction limit amount extractor configured to extract a safe transaction limit amount at the time by using the external information; and a safety determiner configured to determine safety by comparing the safe transaction limit amount with the input transaction amount. Therefore, it is possible to find out a safe amount that changes in real time by considering the external information. Furthermore, it is possible to find out the optimal safe transaction limit amount for a given type of cryptocurrency system.

The safe transaction limit amount extractor may include a calculator configured to extract, as the safe transaction limit amount, an amount that makes an attacker's expected return to be zero. Therefore, since it is based on the attacker's benefit, and the attacker's attack tendency can be predicted, it is possible to find out the block confirmation number more accurately.

The attacker's expected return may be provided by subtracting an attacker's expected cost from the attacker's expected profit.

The safe transaction limit amount ($C_{Req}$) may be extracted by $C_{Req} = (1-P_{AS})/P_{AS} * X(\gamma, t_{cut}) + X(\gamma, T_{AS}) - R(\beta, T_{AS})$.

The safe transaction limit amount extractor may include a parameter optimizer, and the parameter optimizer may be configured to optimally estimate at least one of an attacker's cut time or an attacker's resource proportion. Therefore, it is possible to optimally predict the attacker's selection parameters, thereby suggesting a safer block confirmation number.

When the safety determiner determines that it is not safe, a process of increasing the block confirmation number to extract the safe transaction limit amount again may be repeated. Therefore, the user can find out the most secure and least block confirmation number.

A blockchain transaction confirmation method according to the present disclosure includes: receiving external information that is information about a cryptocurrency system and user information that is inputted by a user; searching for an appropriate confirmation number, which is appropriate for safe and quick transaction; and outputting the appropriate confirmation number. The user can safely and quickly perform transactions through the blockchain.

The searching for the appropriate confirmation number may include: calculating a safe transaction limit amount, which is a safe transaction amount at the time, by using the external information and a block confirmation number; comparing the safe transaction limit amount with the input transaction amount inputted as the user information; and comparing the safe transaction limit amount with the input transaction amount, and if the safe transaction limit amount is greater than the input transaction amount, determining that it is safe and outputting the appropriate block confirmation number. Therefore, the user can find out the safe block confirmation number, or can actually apply the block confirmation number, so that safe transactions can be created.

The blockchain transaction confirmation method may further include comparing the safe transaction limit amount with the input transaction amount, and if the safe transaction limit amount is less than the input transaction amount, determining that it is not safe, increasing the block confirmation number, and calculating the safe transaction limit amount again. Such iterative calculations enable a user to find out the theoretically safest and minimum block confirmation number.

Advantageous Effects

According to the present disclosure, the trader can know the appropriate block confirmation number by inputting only the transaction amount. The term "appropriate" means that the two purposes of the safe transaction and the quick transaction can be achieved at the same time. The meaning of the term "appropriate" in this specification can be understood as above.

According to the present disclosure, it is possible to suggest an appropriate block confirmation number by considering not only the transaction in progress between the parties, but also the environment information (also referred to as external information) of the entire cryptocurrency system that is placed outside the transaction between the parties. Therefore, it is possible to predict the choice of the attacker and suggest the block confirmation number more accurately.

Effects of the invention from the other detailed configurations will be presented in more detail in BEST MODE FOR CARRYING OUT THE INVENTION.

BEST MODE FOR CARRYING OUT THE INVENTION

Hereinafter, specific embodiments of the invention will be described in detail with reference to the accompanying drawings. The present disclosure of invention is not limited to the embodiments presented below, and those skilled in the art who understand the invention will be able to easily propose other embodiments falling within the scope of the same invention by adding, modifying, and deleting elements. However, they also fall within the present disclosure.

Figure 1:
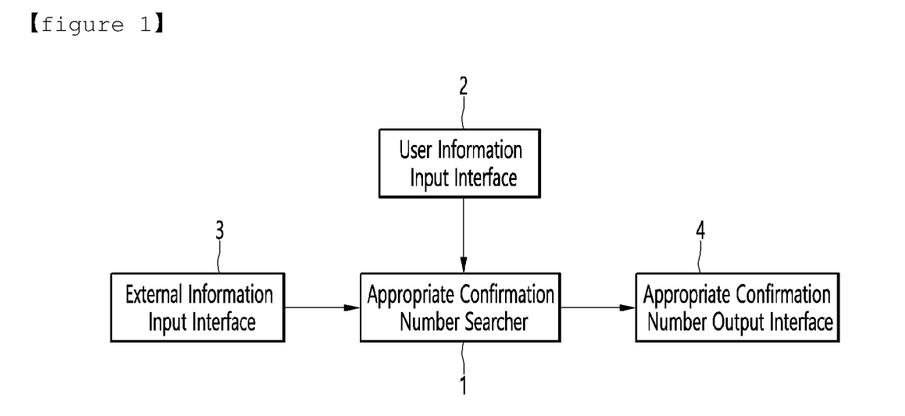
FIG. 1 is a view showing a blockchain transaction confirmation system according to an embodiment.

FIG. 1 is a view showing a blockchain transaction confirmation system according to an embodiment.

Referring to FIG. 1, the blockchain transaction confirmation system includes an appropriate confirmation number searcher 1 that searches for the confirmation number required for transaction confirmation, a user information input interface 2 that receives information inputted by a user of a system and outputs the received information to the appropriate confirmation number searcher 1, and an external information input interface 3 that receives environment information of a cryptocurrency system, that is, external information, and outputs the received environment information to the appropriate confirmation number searcher 1. The appropriate confirmation number searcher 1 may search for an appropriate block confirmation number and output the appropriate block confirmation number to an appropriate confirmation number output interface 4.

The user information input interface 2 may be an input means such as a computer having a display and an input device. The external information input interface 3 may be a communication means connected to a network and a computer that reads and stores public information on the network. The appropriate confirmation number output interface 4 may be an output means such as a computer having a display or a communication means. The appropriate confirmation number searcher 1 may be a computer having an arithmetic unit and a predetermined memory.

The external information may include a reward paid for generating a block at the time, an average cost required for generating a block at the time, and an average rate per time of block generation at the time.

The user information may include information about a transaction amount inputted by the user for a transaction in progress of creation.

The user of the system can be said to be a trader.

In the blockchain transaction confirmation system of the embodiment, the appropriate confirmation number searcher 1 searches for an appropriate block confirmation number by using the information about the transaction amount inputted from the user information input interface 2 and the external information inputted from the external information input interface 3. The found information may be outputted through the appropriate confirmation number output interface 4.

The user can set the block confirmation number by himself or herself by using the appropriate block confirmation number outputted from the appropriate confirmation number output interface 4. Depending on the block confirmation number, the transaction can be finalized after the block confirmations are performed.

Without setting the block confirmation number by the user, the block confirmation number outputted from the appropriate confirmation number output interface 4 may be automatically applied and the blockchain transaction confirmation system may be operated.

The blockchain transaction confirmation system presented in FIG. 1 may be mounted on a terminal of a trader.

A unit block presented in FIG. 1 is provided to the terminal of the trader, and another unit block is provided to at least one of the terminal of the counterpart trader or a cryptocurrency exchange, so that the blockchain transaction confirmation system may be operated in a state of being connected through the network.

Although not shown in FIG. 1, of course, it can be understood that the blockchain transaction confirmation system includes a network node where any other user of the cryptocurrency system chains blocks through block generation. That is, the terminal of at least one other node on the network cooperates and chains as many blocks as the block confirmation number required to finalize the transaction in progress by performing transaction confirmation.

The blockchain transaction confirmation method according to the embodiment may search for the appropriate confirmation number after receiving the external information and the user information. Thereafter, it can be performed by outputting the found appropriate confirmation number.

The output of the appropriate confirmation number searcher may be fulfilled by a user inputting a block confirmation number after the appropriate block confirmation number is outputted to the user. Alternatively, block confirmation may be automatically performed according to the appropriate block confirmation number.

Figure 2:
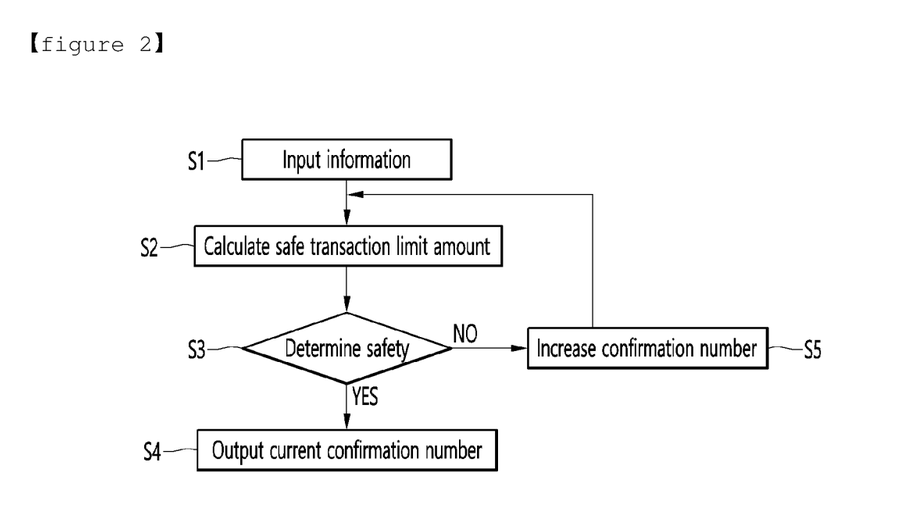
FIG. 2 is a view showing an appropriate confirmation number searcher in detail.

FIG. 2 is a view showing the appropriate confirmation number searcher in detail.

Referring to FIG. 2, the appropriate confirmation number searcher 1 may include a safe transaction limit amount extractor 10 that extracts a safe level of transaction amount at the time, a safety determiner 12 that determines the safety of a transaction by comparing the safe transaction limit amount extracted by the safe transaction limit amount extractor 10 with a transaction amount inputted by a user, and a memory 11 that stores information necessary for the operation of the safety determiner 12 and the safe transaction limit amount extractor 10.

Figure 3:
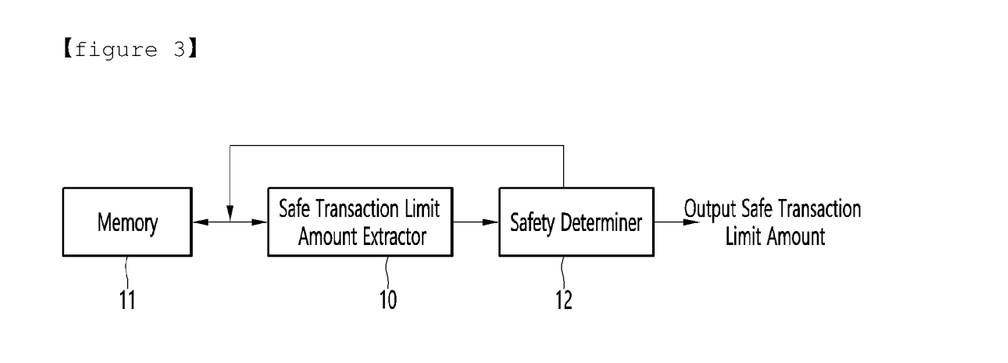
FIG. 3 is a flowchart showing a part of a blockchain transaction confirmation method, describing the detailed operation of the appropriate confirmation number searcher.

FIG. 3 is a flowchart showing a part of the blockchain transaction confirmation method, describing the detailed operation of the appropriate confirmation number searcher.

Referring to FIGS. 2 and 3, the external information and the user information are inputted (S1). The external information may include a reward paid for generation of a block at the time, an average cost required for generating a block at the time, and an average rate per time of block generation at the time. The user information may include transaction amount information inputted by the user. The transaction amount may be information about the amount of currency or cryptocurrency used in each country. For example, a KRW amount or BTC amount may be included as the information.

The safe transaction limit amount is calculated by using the input information (S2). The safe transaction limit amount may be calculated by comparing the cost and profit of the attacker predicted by the external information. The calculation of the safe transaction limit amount will be described in more detail later.

It is determined whether the transaction in progress is safe by comparing the safe transaction limit amount calculated in the safe transaction limit amount calculation operation (S2) with the input transaction amount inputted as the user information (S3).

In the safety determination operation (S3), the input transaction amount and the safe transaction limit amount are compared with each other, and if the input transaction amount is smaller, the transaction is determined as safe and the current confirmation number is outputted (S4).

Conversely, in the safety determination operation S3, if the input transaction amount is greater, the transaction is determined as not safe, and the confirmation number is increased (S5), and the safe transaction limit amount calculation operation (S2) is performed again. For example, when the current confirmation number is 1, the confirmation number may be increased to 2. Thereafter, the confirmation number becomes 2 and the safe transaction limit amount may be recalculated by using the user information and the real-time external information.

In the safety transaction limit amount calculation operation (S2) performed again, since the confirmation number is increased, it may be expected that the safety transaction limit amount will increase.

The safe transaction limit amount calculation operation (S2) and the operation of the safe transaction limit amount extractor 10 will be described in detail below.

The safe transaction limit amount may be calculated by comparing the cost required for the attacker to perform a double spending attack (in this specification, when referred to as an attack, it means a double spending attack unless otherwise specified) with a profit obtained when the attacker succeeds in the double spending attack.

For example, this is because, when the profit obtained by the attacker when the attack is successful is smaller than the cost of the attack, the attacker will not try an attack, or even when the attacker pushes an attack, it will not be successful.

In other words, if there exists an expected return of an attacker by 'attacker's expected return=attacker's expected profit−attacker's expected cost', it can be expected that the attacker will attack, and conversely, if there is no expected return of the attacker, it can be expected that the attacker will not attack. The transaction amount in a state in which the expected return of the attacker becomes zero may be defined as the safe transaction limit amount.

The expected profit of the attacker may be given as the sum of the return (C+R) when the attack is successful and the return (zero) when the attack fails. For simplicity, it can be written as $P_{AS}*(C+R(\beta, T_{AS}))$.

The expected cost of the attacker may be given as the sum of the cost for certain time duration ($T_{AS}$) when the attack is successful and the cost for the cut time ($t_{cut}$) when the attack fails. Briefly, it can be given as $P_{AS}*X(\gamma, E[T_{AS}])+(1-P_{AS})*X(\gamma, t_{cut})$. The cut time may refer to the time to stop the attack after taking a certain amount of loss so as to prevent a larger loss with estimating that the probability of success in the attack is slim after the cut time has elapsed.

Consequently, the expected return of the attacker may be calculated as $P_{AS}*(C+R(\beta, E[T_{AS}])-X(\gamma,E[T_{AS}])-(1-P_{AS})*X(\gamma, t_{cut})$.

The safe transaction limit amount ($C_{Req}$) may be defined as a transaction amount at which the expected return of the attacker becomes zero. Therefore, when the transaction amount (C) is rearranged on the left-hand side of the equation and the remaining terms are rearranged on the right-hand side of the equation while keeping the expected return of the attacker equals zero, one can obtain $C_{Req.}=(1-P_{AS})/P_{AS}*X(\gamma, t_{cut})+X(\gamma, T_{AS})-R(\beta, T_{AS})$.

Table 1 summarizes the meanings of each symbol presented in the above description and various symbols used in the actual calculation of the safe transaction limit amount below.

TABLE 1

| Symbol (unit) | Description | Remarks |
|---|---|---|
| C ($, BTC) | Transaction amount of a transaction targeted by a double-spending attack | User input value |
| β ($, BTC) | Reward paid for generating a block | External input value |
| γ ($, BTC) | Average cost required for generating a block | External input value |
| $\lambda_A$ (No./T) | Attacker's average block generation rate per time (the best of the different and known may be used depending on the attacker) (the attacker may join a pool, perform block generation, and perform collusion between pools) | External input value |
| $\lambda_H$ (No./T) | Honest nodes' average block generation rate per time | External input value |
| $\lambda_T$ (No./T) | The total rate of block generation per time | External input value |
| $t_{cut}$ (T) | Attack cut-time to prevent loss from growing indefinitely | Estimated confirmation value |
| $p_A$ (%) | Percentage of computational resources occupied by attacker | Estimated confirmation value |
| $N_{BC}$ (No.) | Block confirmation number a trader confirms block generations before finalizing a transaction | Output value |
| E [$T_{AS}$] (T) | Average time taken until a double spending attack is successful, less than $t_{cut}$. | Calculated value |
| $P_{AS}$ (dimensionless) | Probability that a double spending attack will be successful within $t_{cut}$ | Calculated value |
| R (β ,t) ($, BTC) | Average reward of an attacker when generating blocks for time t (function that increases by β and t) | Calculated value |
| X (γ ,t) ($, BTC) | Average cost of an attacker when generating blocks for time t (function that increases by γ and t) | Calculated value |

The remarks column indicates the source of the values of each symbol.

User input value is user information inputted by the user and means a transaction amount herein.

External input value is a value that is posted in the system of each cryptocurrency and changes in real time. For example, the external input value is posted on btc.com in the case of Bitcoin and in etherscan.io in the case of Ethereum.

Figure 4:
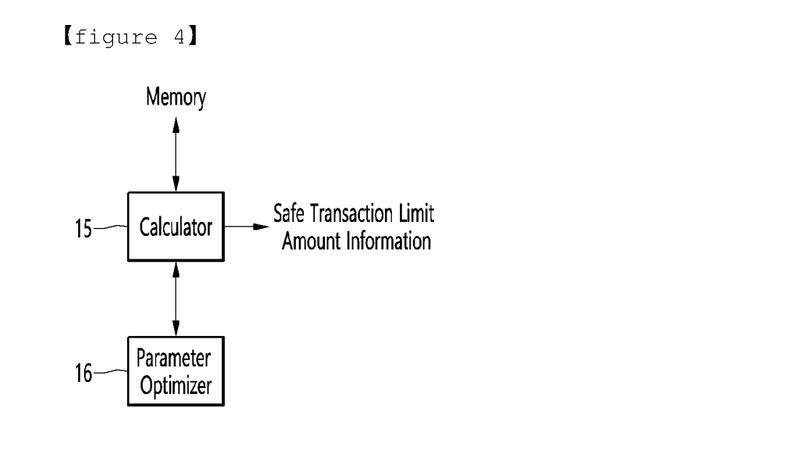
FIG. 4 is a view showing a detailed configuration of a safe transaction limit amount extractor.

The estimated confirmation value is a value that is selectable by an attacker and may be selected as the safest value while calculating the safe transaction limit amount. The estimated confirmation value may be optimally estimated by a parameter optimizer 16, which will be described later.

The output value is a value that is outputted for one purpose in this embodiment, and represents the block confirmation number as a safe confirmation number.

The calculated value is a value that is used in the middle of the calculation of the safe transaction limit amount.

The process of calculating the safe transaction limit amount and the configuration of the safe transaction limit amount detector 10 that detects the safe transaction limit amount at the time will be described in more detail.

FIG. 4 is a view showing a detailed configuration of the safe transaction limit amount extractor.

Referring to FIG. 4, the safe transaction limit amount extractor 10 includes a calculator 15 that calculates the safe transaction limit amount, and a parameter optimizer 16 that optimizes the parameters required for executing the calculator 15.

The parameter optimizer 16 is a block for optimizing the estimated confirmation value, and is a value capable of predicting an attack from an attacker's point of view.

The detailed operation of the safe transaction limit amount extractor 10 will be described in detail with a number of equations. In the following description, it can be understood that all parts that are not referring to the parameter optimizer 16 are performed by the operation interface 15.

Equation 1 below exemplifies converting the unit of the average block generation cost from cost per time into cost per block.

$$\gamma = 4.63 \cdot 10^{-22} \ [BTC/\text{hash}] \times 456E[\text{hashes/block mining}] \quad \text{[Equation 1]}$$
$$\approx 0.21 \ [BTC/\text{block mining}].$$

Referring to Equation 1, the block generation cost per block may be obtained by multiplying the number of hashes/block by the block generation cost/hashes known as the external information. The result of Equation 1 may be stored in a memory.

Equation 2 below exemplifies finding out the attacker's block generation rate per time.

$$p_A := Pr(S_i = n+1 \mid S_{i-1} = n) = \frac{\lambda_A}{\lambda_T}, \quad \text{[Equation 2]}$$
$$p_H := Pr(S_i = n-1 \mid S_{i-1} = n) = \frac{\lambda_H}{\lambda_T},$$

In Equation 2, λ stands for speed, H (honest) stands for honest nodes, T (Total) stands for total, A (attacker) stands for the attacker, $p_A$ is the proportion of resources the attacker has, and $p_H$ is the proportion of resources the honest nodes have. The lowercase p in $p_H$ can be understood as an acronym for proportion.

It is possible to find out the attacker's block generation rate per time ($\lambda_T$) through Equation 2 above. The result of Equation 2 may be stored in the memory 11. The memory 11 may store information necessary for calculation as well as the block generation cost and the block generation rate per time.

Equation 3 below is the probability of successful attack when the attack is made with the infinite cut time, and is disclosed in the paper of Satoshi Nakamoto cited in Non-Patent Literature.

$$\mathbb{P}_{AS-ICT}(p_A; N_{BC}) = \begin{cases} 1, & p_H \le p_A, \\ 1 - p_A^{N_{BC}+1} p_H^{N_{BC}} \sum_{j=N_{BC}}^{2N_{BC}} \binom{j-1}{N_{BC}-1} A_j, & p_H > p_A, \end{cases} \quad \text{[Equation 3]}$$

where $$A_j \triangleq p_A^{j-2N_{BC}-1} - p_H^{j-2N_{BC}-1}.$$

In Equation 3, P represents probability, AS stands for attack success, ICT stands for the infinite cut time meaning that the cut time is infinite, and $N_{BC}$ represents the block confirmation number for confirmations.

Equation 4 below is an equation derived by Equation 3, and represents a probability distribution regarding the probability of successful attack within a given time.

$$f_{T^{(1),(2)}}(t) = \frac{p_A \lambda_T e^{-\lambda_T t} (p_A p_H (\lambda_T t)^2)^{N_{BC}}}{(2N_{BC})!} \cdot \quad \text{[Equation 4]}$$

$$\sum_{j=N_{BC}}^{j=2N_{BC}} \binom{j-1}{N_{BC}-1} {}_2F_3(a; b; p_A p_H (\lambda_T t)^2) +$$

$$\frac{e^{-\lambda_T t}(p_H \lambda_T t)^{N_{BC}}}{t(N_{BC}-1)!}\left(e^{p_A \lambda_T t} - \sum_{i=0}^{N_{BC}} \frac{(p_A \lambda_T t)^i}{i!}\right) +$$

$$(1 - \mathbb{P}_{AS-ICT})\delta(t-\infty),$$

In Equation 4, $_pF_q$ is a generalized hypergeometric function defined in [G Gasper and M Rahman, "Basic Hypergeometric series," in Basic hypergeometric series, Second, vol 96, Cambridge University Press, Cambridge, 2004], and a and b are defined in Equation 5.

$$a = \begin{bmatrix} N_{BC} + 1 - j/2 \\ N_{BC} + 1/2 - j/2 \end{bmatrix} \quad \text{[Equation 5]}$$

$$b = \begin{bmatrix} 2N_{BC} + 2 - j \\ N_{BC} + 1 \\ N_{BC} + 1/2 \end{bmatrix}.$$

By taking the first integration on the probability distribution of Equation 4, it is possible to find out the probability of successful attack within the cut time of Equation 6 below.

$$\mathbb{P}_{AS}(p_A t_{cut}; N_{BC}) := Pr(T^{(1),(2)} < t_{cut}) \quad \text{[Equation 6]}$$

By taking the second integration on the probability distribution of Equation 5, it is possible to find out the average time required to succeed in the attack within the cut time of Equation 7 below.

$$\mathbb{E}_{T_{AS}}(p_A, t_{cut}; N_{BC}) = \frac{\int_0^{t_{cut}} t f_{T^{(1),(2)}}(t) dt}{\mathbb{P}_{AS}(p_A, t_{cut}; N_{BC})} \quad \text{[Equation 7]}$$

E is the expectation, P is the probability, and f is the probability distribution in probability theory.

Using Equations 6 and 7, the average attack cost of the attacker can be found as Equation 8.

$$\mathbb{E}_X(p_A t_{cut}; N_{BC}) := \mathbb{P}_{AS}(p_A t_{cut}; N_{BC}) \mathbb{E}[X(\lambda_A, T_{AS})] + (1 - \mathbb{P}_{AS}(p_A t_{cut}; N_{BC})) X(\lambda_A, T_{AS}) \quad \text{[Equation 8]}$$

X represents the block generation cost. The provision of the block generation cost X as a linear function illustrates the cost of renting block generating equipment through a rental agency on the Internet (e.g., nicehach.com) as a linear function. In response to various cases, such as a case in which the block generation cost is not a rental cost but an electricity usage fee for equipment, the cost function X is an n-square function, an n-root function, a logarithmic function, an exponential function, or an n-root function.

On the other hand, using Equation 3, the average time ($\mathbb{E}_{AS-PCT}(p_A; N_B)$) required for attack success when the cut time is infinite can be found as Equation 9.

$$\mathbb{E}_{T_{AS-ICT}}(p_A; N_{BC}) = \frac{\lambda_T^{-1}\left(\sum_{j=N_{BC}}^{2N_{BC}} \binom{j-1}{N_{BC}-1} Z_j + \frac{N_{BC}}{p_H}\right)}{\mathbb{P}_{AS-ICT}(p_A; N_{BC})} \quad \text{[Equation 9]}$$

where $$Z_j := p_A p_m^{N_{BC}} p_M^{-(N_{BC}-j+1)}\left(\frac{2N_{BC} - 2jp_m + 1}{p_M - p_m}\right) - jp_A^{-(N_{BC}-j)} p_H^{N_{BC}}.$$

Using Equation 9, it is possible to find out the resource proportion $p_A$ occupied by the attacker, which predicts the resource occupied by the attacker and presents the most stable confirmation amount.

Figure 6:
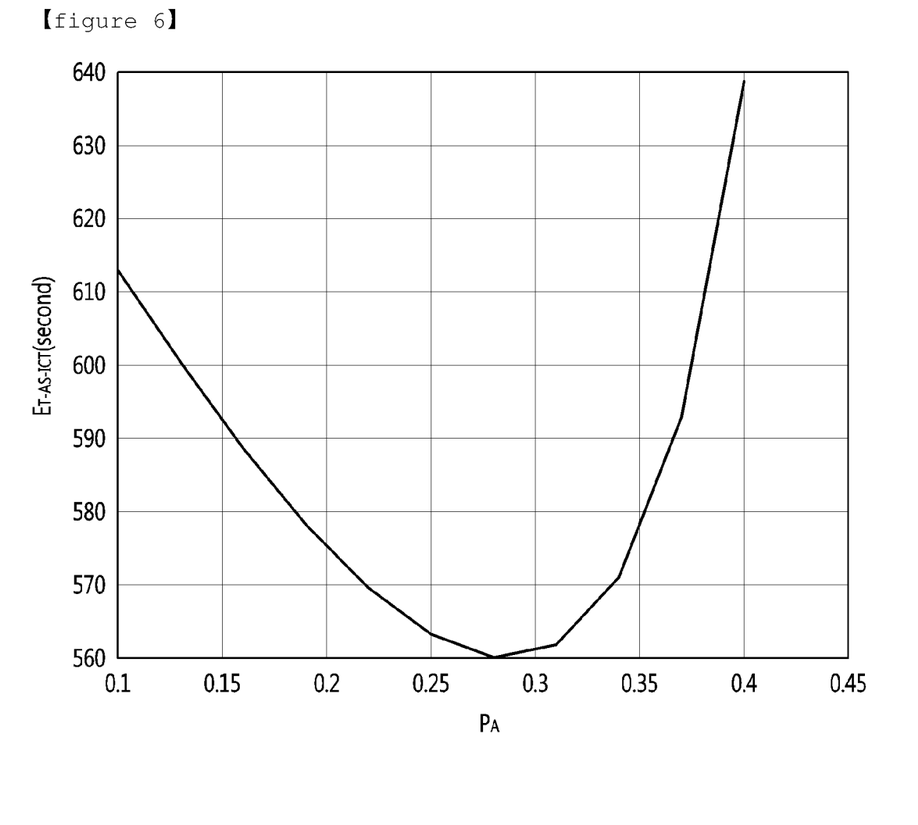
FIG. 6 is an exemplary graph of an average time ($E_{T_{AS-ICT}}(p_A;N_{BC})$) required for attack success when a cut time is infinite with a resource proportion $p_A$ occupied by an attacker as a variable.

Specifically, referring to Equation 9 above, if the cut time is infinite, the average time $$(\mathbb{E}_{T_{AS-ICT}}(p_A; N_{BC}))$$

required for attack success is a function using the resource proportion $p_A$ occupied by the attacker as a variable. In this case, when the average time $$(\mathbb{E}_{T_{AS-ICT}}(p_A; N_{BC}))$$

required for attack success is calculated when the cut time is infinite using the resource proportion $p_A$ occupied by the attacker as a variable, the average time $$(\mathbb{E}_{T_{AS-ICT}}(p_A; N_{BC}))$$

appears as a downwardly convex function as shown in FIG. 6.

Therefore, on the graph of FIG. 6, by taking the resource proportion $p_A$ occupied by the lowest attacker, it is possible to most stably optimize the resource proportion occupied by the attacker. This is because the attacker will select the occupied resource proportion that can obtain the effect of quick attack at the lowest cost.

In this case, the optimization of the resource proportion occupied by the attacker may be performed by the parameter optimizer 16 through a separate operation from the operation interface 15. The resource proportion occupied by the attacker, which is optimized in the parameter optimizer 16, is fed back to the operation interface 15 and may be used to obtain the safe transaction limit amount.

Thereafter, the following Equation 10 is applied to obtain the safe transaction limit amount.

$$C_{Req.} = \frac{\mathbb{E}_X(p_A, t_{cut}; N_{BC})}{\mathbb{P}_{AS}(p_A, t_{cut}; N_{BC})} - \mathbb{E}[R(\lambda_A, T_{AS})] \qquad \text{[Equation 10]}$$

In Equation 10, R is the reward, and R may be given as in Equation 11 below.

$$R(\lambda_A, t) := \beta \lambda_A t (\log_{r_1} r_2)^{\lambda_A} (\log_{r_3} r_4)^t \qquad \text{[Equation 11]}$$

In Equation 11, the logarithm factor indicates that the reward can be a log function or an exponential function with respect to time. However, when given as a function linear to time, all logarithm factors may be given as 1.

However, similarly to the block generation cost (X), the reward R may also be an n-square function, an n-root function, a log function, an exponential function, or an n-root function.

Referring back to Equation 10, the cut time $t_{cut}$ is still unknown, and Equation 10 can be given as a function using the cut time as a variable. Therefore, it is possible to find the value of the cut time that optimizes the safe transaction limit amount $C_{req}$.

Figure 7:
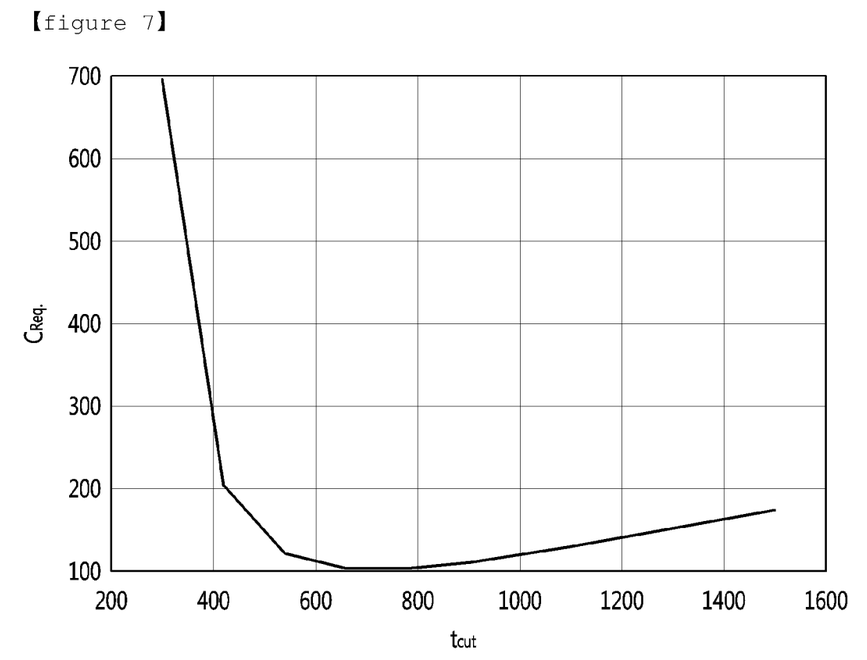
FIG. 7 is an exemplary graph of a safe transaction limit amount with a cut time as a variable.

FIG. 7 is a graph showing the safe transaction limit amount with respect to the cut time as a variable.

Referring to FIG. 7, the safe transaction limit amount with respect to the cut time is shown as a downwardly convex graph. As the safest transaction limit amount, the minimum confirmation amount may be outputted. The operation of obtaining the optimum value of the safe transaction limit amount with respect to the cut time may be performed by the parameter optimizer 16.

The parameter optimizer 16 may output the minimum safe transaction limit amount to the operation interface 15.

On the other hand, the above description can be applied if the resource proportion of the attacker is 50% or less.

In contrast, if the resource proportion of the attacker is greater than 50%, the attacker may set the cut time to infinity, as described above. This is because, if the resource proportion is greater than 50%, it is guaranteed that the attacker will make a longer blockchain one day, and therefore the attack will ever succeed one day.

We will describe the details how to optimize the cut time ($t_{cut}$) of the attacker and the resource proportion $p_A$ of the attacker, which should be estimated, for each of two cases where the resource proportion of the attacker is less than 50% (hereinafter referred to as 50% attack) and where the resource proportion of the attacker is greater than 50% (hereinafter referred to as a 51% attack).

The optimization of the cut time $t_{cut}$ of the attacker and the resource proportion $p_A$ of the attacker may be performed by the parameter optimizer 16.

In general, the appropriate block confirmation number for the 51% attack is greater than that for the 50% attack. In a network with huge computational resources such as Bitcoin, it is very difficult for a specific group to get more than 51% of computational resources. Therefore, it is sufficient to prepare for the 50% attack. In contrast, in a network with small computational resources, the 51% attack may be possible, and thus more thorough preparation is required.

First, in the case of the 51% attack, the optimal cut time for the attacker is infinite, and the optimal attack resource proportion is calculable.

The returns may be compared for the two cases of a finite cut time and the infinite cut time. For example, if the reward β for block generation is greater than the cost γ for block generation, that is, if the reward per time for block generation is greater than the cost per time for block generation, the attack return is maximized when the cut time is set to infinite.

In contrast, if the reward β for block generation is less than the cost γ for block generation, it is not true that an infinite cut time always makes the attack return maximized, but in many practical cases it can be true. In addition, in normal networks, it is natural that β is formed greater than γ by the market economy.

When the cut time is infinite in the 51% attack case, the safe transaction limit amount $C_{Req}$ is a function that is downwardly convex with respect to the resource proportion $p_A$ of the attacker. This has been proven mathematically and is exemplified in FIG. 5.

That is, there exists the minimum of the safe transaction limit amount $C_{Req}$ with respect to the resource proportion $p_A$ of the attacker. When $C < C^*_{Req}$ is satisfied by comparing the input transaction amount C with the safe confirmation amount $C_{Req}$, it always holds that $C < C_{Req}$ for all the other resource proportions, and thus it can be seen that the transaction is safe. In other words, the trader only needs to consider the worst case of attack resource proportion in order to check the safety. For example, it is sufficient to select the minimum of the safe transaction limit amount in FIG. 5.

Second, even in the 50% attack case, it is possible to consider the optimal cut time $t_{cut}$ and the optimal attack resource proportion $p_A$ of the most reasonable attacker.

In the case of the 50% attack, the resource proportion $p_A$ of the attacker at which the average attack success time is minimized is a reasonable attack resource proportion. In the case of the 50% attack, unlike the 51% attack, there is no need to consider the infinite cut time, because in that case the attacker's expected loss becomes infinitely large.

Therefore, the attacker is forced to select a finite cut time. From the attacker's point of view, when selecting the cut time, the average time required for a success of attack, that is, the attack success average time, has to be taken into consideration. For example, when the average attack success time is known, the cut time when attempting the attack may be set to be equal, slightly greater, or several times greater than the average attack success time.

In the case of the 50% attack, the attack success probability is not very high, and thus an attacker will make a return by attempting the attack several times. Therefore, the time it takes to turn from a deficit to a surplus will be delayed as each attack attempt takes the longer time. In order to find the cut time quickly and accurately, the attacker will search the optimal attack resource proportion $p_A$ at which the average attack success time is minimized.

It is numerically checked that the attack success time is a downwardly convex function as shown in FIG. 6, that is, a function having the minimum. Therefore, in the case of the 50% attack, it can be assumed that the optimal attack resource proportion $p_A$ at which the average attack success time is minimized is a reasonable estimation of the attack resource proportion.

In addition, for a fixed attack resource proportion $p_A$, it is checked as shown in FIG. 7 that the safe transaction limit amount $C_{Req}$ is a downwardly convex function with respect to $t_{cut}$. That is, there is the minimum of the safe transaction limit amount at some cut time. Therefore, in order to determine the safety, the trader only needs to consider the case in which the cut time is the worst case, that is, the case in which the safe trade limit amount is the minimum.

When the resource proportion of the attacker is greater than 50%, the attacker may set the cut time to infinity, as described above.

In this case, the safe transaction limit amount can be found as in Equation 12 below by using the average time $\mathbb{E}_{T_{AS\text{-}ICT}}(p_A;N_{BC})$ required for attack success when the cut time is infinite, which is presented in Equation 9. In other words, in this case, the cut time is infinite.

$$C_{Req.} = \max(0,(\gamma-\beta)\lambda_{TP_A}\mathbb{E}_{T_{AS\text{-}ICT}}(p_A;N_{BC})) \qquad [\text{Equation 12}]$$

Referring to Equation 12, the resource proportion $p_A$ occupied by the attacker is unknown, and Equation 12 may be given as a function using the resource proportion $p_A$ occupied by the attacker as a variable. Therefore, it is possible to optimize the safe transaction limit amount $C_{req}$ by using the resource proportion $p_A$ occupied by the attacker as a variable. The optimization may be performed by the parameter optimizer 16.

The graph exemplifies the safe transaction limit amount as a function with respect to the attack resource proportion $p_A$ has already been described with reference to FIG. 5.

Figure 5:
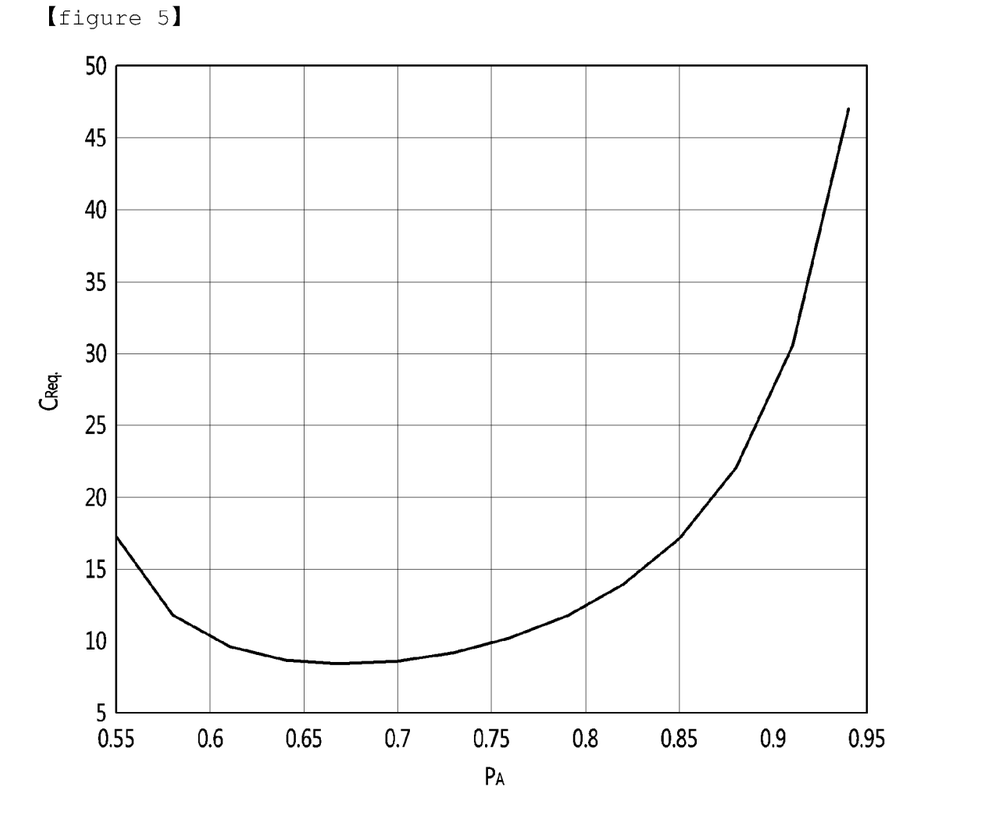
FIG. 5 is an exemplary graph of a safe transaction limit amount with a resource proportion $p_A$ occupied by an attacker as a variable.

Referring to FIG. 5, the safe transaction limit amount with respect to the attack resource proportion $p_A$ is shown as a downwardly convex graph. The minimum of the safe transaction limit amount may be outputted as the safest transaction limit amount.

According to the invention described in this disclosure, the user can output the appropriate block confirmation number by inputting only the transaction amount, and can set the block confirmation number according to the appropriate confirmation number. Due to this, there is an advantage that safe and quick commercial transaction using cryptocurrency is possible.

In addition, in the process of calculating the safe transaction limit amount, the parameters as criteria for determining the stability of the transaction that need to be estimated are optimized. Therefore, even when the user inputs only the transaction amount, the appropriate block confirmation number can be found.

INDUSTRIAL APPLICABILITY

According to the present disclosure of invention, the invention enables to further promote the commercialization of actual trading using the cryptocurrency system by guaranteeing the safety and quickness of transactions.

The invention claimed is:

1. A blockchain transaction confirmation system comprising:
   a user information input interface operating on one or more computer devices having one or more memory devices, connected to communication network, and configured to receive information including user information;
   an external information input interface operating on the one or more computer devices configured to receive additional information including external information related to a cryptocurrency system and store the information on the one or more memory devices;
   an appropriate confirmation number searching module, operable on the one or more computer devices and configured to search the one or more memory devices for a block confirmation number appropriate for confirmation of a transaction in progress of creation, by using the external information and the user information, wherein the block confirmation number is a number to finalize a transaction after confirming that blocks corresponding to the block confirmation number are generated by the one or more computer devices after the transaction in progress between traders has occurred
   an appropriate confirmation number output interface operating on the one or more computer devices and configured to output the blockchain confirmation number;
   wherein the user information includes at least an input transaction amount inputted into the one or more computer devices by a user;
   wherein the appropriate confirmation number searching module comprises:
      a safe transaction limit amount extractor module configured to operate on the one or more computer devices and configured to extract a safe transaction limit amount, defined as the upper limit for a safe transaction at a given time, based on the external information and the currently set block confirmation number; and
      a safety determiner module operable on the one or more computer devices and configured to compare the safe transaction limit amount with the input transaction amount included in the user information, and to determine that the transaction is safe when the safe transaction limit amount exceeds the input transaction amount, in which case the block confirmation number currently set is output as the safe block confirmation number;
   wherein the safe transaction limit amount extractor module comprises a calculator configured to extract, as the safe transaction limit amount, an amount that makes an attacker's expected return to be zero; and
   wherein the safe transaction limit amount ($C_{Req}$) is extracted by $C_{Req.} = (1-P_{AS})/P_{AS} * X(\gamma, t_{cut}) + X(\gamma, T_{AS}) - R(\beta, T_{AS})$,
   wherein $P_{AS}$ (dimensionless) is a probability that double spending attack will succeed within $t_{cut}$,
   $X(\gamma,t)$ is an average block generation cost (function increasing for $\gamma$ and t) for a time duration t,
   $\gamma$ is an average cost required for a single block generation,
   $T_{AS}$ is a time taken until an attack is successful,
   $\beta$ is a reward paid for a single block generation, and
   $R(\beta,t)$ is an average block generation reward (function increasing for $\beta$ and t) for a time duration t.

2. The blockchain transaction confirmation system of claim 1, wherein the external information includes at least one of a reward paid for generating a block at the time, an average cost required for generating a block at the time, or an average rate per time of block generation at the time.

3. The blockchain transaction confirmation system of claim 2, wherein the external information includes all of a reward paid for generating a block at the time, an average cost required for generating a block at the time, and an average rate per time of block generation at the time.

4. The blockchain transaction confirmation system of claim 1, wherein the attacker's expected return is provided by subtracting an attacker's expected cost from the attacker's expected profit.

5. The blockchain transaction confirmation system of claim 1, wherein the safe transaction limit amount extractor comprises a parameter optimizer, and the parameter optimizer is configured to optimally estimate at least one of an attacker's cut time or an attacker's resource proportion.

6. The blockchain transaction confirmation system of claim 5, wherein the safe transaction limit amount extractor comprises a parameter optimizer, and the parameter optimizer is configured to optimally estimate an attacker's cut time or an attacker's resource proportion.

\* \* \* \* \*